(12) United States Patent  
Sirotkin

(10) Patent No.: US 11,910,353 B2  
(45) Date of Patent: Feb. 20, 2024

(54) POSITIONING MEASUREMENTS IN NEW RADIO POSITIONING PROTOCOL A (NRPPA)

(71) Applicant: Intel Corporation, Santa Clara, CA (US)

(72) Inventor: Alexander Sirotkin, Tel-Aviv (IL)

(73) Assignee: Intel Corporation, Santa Clara, CA (US)

( * ) Notice: Subject to any disclaimer, the term of this patent is extended or adjusted under 35 U.S.C. 154(b) by 191 days.

(21) Appl. No.: 17/174,683

(22) Filed: Feb. 12, 2021

(65) Prior Publication Data

US 2021/0168755 A1 Jun. 3, 2021

Related U.S. Application Data

(60) Provisional application No. 62/976,693, filed on Feb. 14, 2020.

(51) Int. Cl.
| | |
|---|---|
| *H04W 64/00* | (2009.01) |
| *H04W 24/10* | (2009.01) |
| *H04B 17/318* | (2015.01) |
| *H04W 56/00* | (2009.01) |
| *H04B 7/06* | (2006.01) |

(52) U.S. Cl.
CPC ........ *H04W 64/006* (2013.01); *H04B 7/0626* (2013.01); *H04B 17/318* (2015.01); *H04W 24/10* (2013.01); *H04W 56/0095* (2013.01)

(58) Field of Classification Search
None
See application file for complete search history.

(56) References Cited

U.S. PATENT DOCUMENTS

| | | | | |
|---|---|---|---|---|
| 2020/0137715 | A1* | 4/2020 | Edge | G01S 5/06 |
| 2022/0060243 | A1* | 2/2022 | Keating | G01S 5/0221 |
| 2022/0386267 | A1* | 12/2022 | Zhang | H04W 24/10 |
| 2023/0067678 | A1* | 3/2023 | Bi | H04L 5/0069 |

* cited by examiner

*Primary Examiner* — Scott M Sciacca
(74) *Attorney, Agent, or Firm* — Schwegman Lundberg & Woessner, P.A.

(57) ABSTRACT

An apparatus for use in a RAN network node includes processing circuitry coupled to a memory. To configure the RAN network node for positioning measurement reporting in a wireless network, the processing circuitry is to decode a measurement request message from a location management function (LMF) node of the wireless network. The processing circuitry also encodes a measurement response message for transmission to the LMF node based on the measurement request message.

20 Claims, 4 Drawing Sheets

POSITIONING MEASUREMENTS IN NEW RADIO POSITIONING PROTOCOL A (NRPPA)

PRIORITY CLAIM

This application claims the benefit of priority under 35 U.S.C. 119(e) to U.S. Provisional Patent Application Ser. No. 62/976,693, filed Feb. 14, 2020, and entitled "POSITIONING MEASUREMENTS IN NEW RADIO POSITIONING PROTOCOL A," which provisional patent application is incorporated herein by reference in its entirety.

TECHNICAL FIELD

Aspects pertain to wireless communications. Some aspects relate to wireless networks including 3GPP (Third Generation Partnership Project) networks, 3GPP LTE (Long Term Evolution) networks, 3GPP LTE-A (LTE Advanced) networks, and fifth-generation (5G) networks including 5G new radio (NR) (or 5G-NR) networks and 5G-LTE networks such as 5G NR unlicensed spectrum (NR-U) networks. Other aspects are directed to systems and methods for positioning measurements such as positioning measurements in NRPPa.

BACKGROUND

Mobile communications have evolved significantly from early voice systems to today's highly sophisticated integrated communication platform. With the increase in different types of devices communicating with various network devices, usage of 3GPP LTE systems has increased. The penetration of mobile devices (user equipment or UEs) in modern society has continued to drive demand for a wide variety of networked devices in many disparate environments. Fifth-generation (5G) wireless systems are forthcoming and are expected to enable even greater speed, connectivity, and usability. Next generation 5G networks (or NR networks) are expected to increase throughput, coverage, and robustness and reduce latency and operational and capital expenditures. 5G-NR networks will continue to evolve based on 3GPP LTE-Advanced with additional potential new radio access technologies (RATs) to enrich people's lives with seamless wireless connectivity solutions delivering fast, rich content and services. As current cellular network frequency is saturated, higher frequencies, such as millimeter wave mmWave) frequency, can be beneficial due to their high bandwidth.

Potential LTE operation in the unlicensed spectrum includes (and is not limited to) the LTE operation in the unlicensed spectrum via dual connectivity (DC), or DC-based LAA, and the standalone LTE system in the unlicensed spectrum, according to which LTE-based technology solely operates in the unlicensed spectrum without requiring an "anchor" in the licensed spectrum, called MulteFire. MulteFire combines the performance benefits of LTE technology with the simplicity of Wi-Fi-like deployments.

Further enhanced operation of LTE systems in the licensed, as well as unlicensed spectrum, is expected in future releases and 5G systems. Such enhanced operations can include techniques for performing positioning measurements such as positioning measurements in NRPPa.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various aspects discussed in the present document.

DETAILED DESCRIPTION

The following description and the drawings sufficiently illustrate aspects to enable those skilled in the art to practice them. Other aspects may incorporate structural, logical, electrical, process, and other changes. Portions and features of some aspects may be included in or substituted for, those of other aspects. Aspects outlined in the claims encompass all available equivalents of those claims.

Figure 1A:
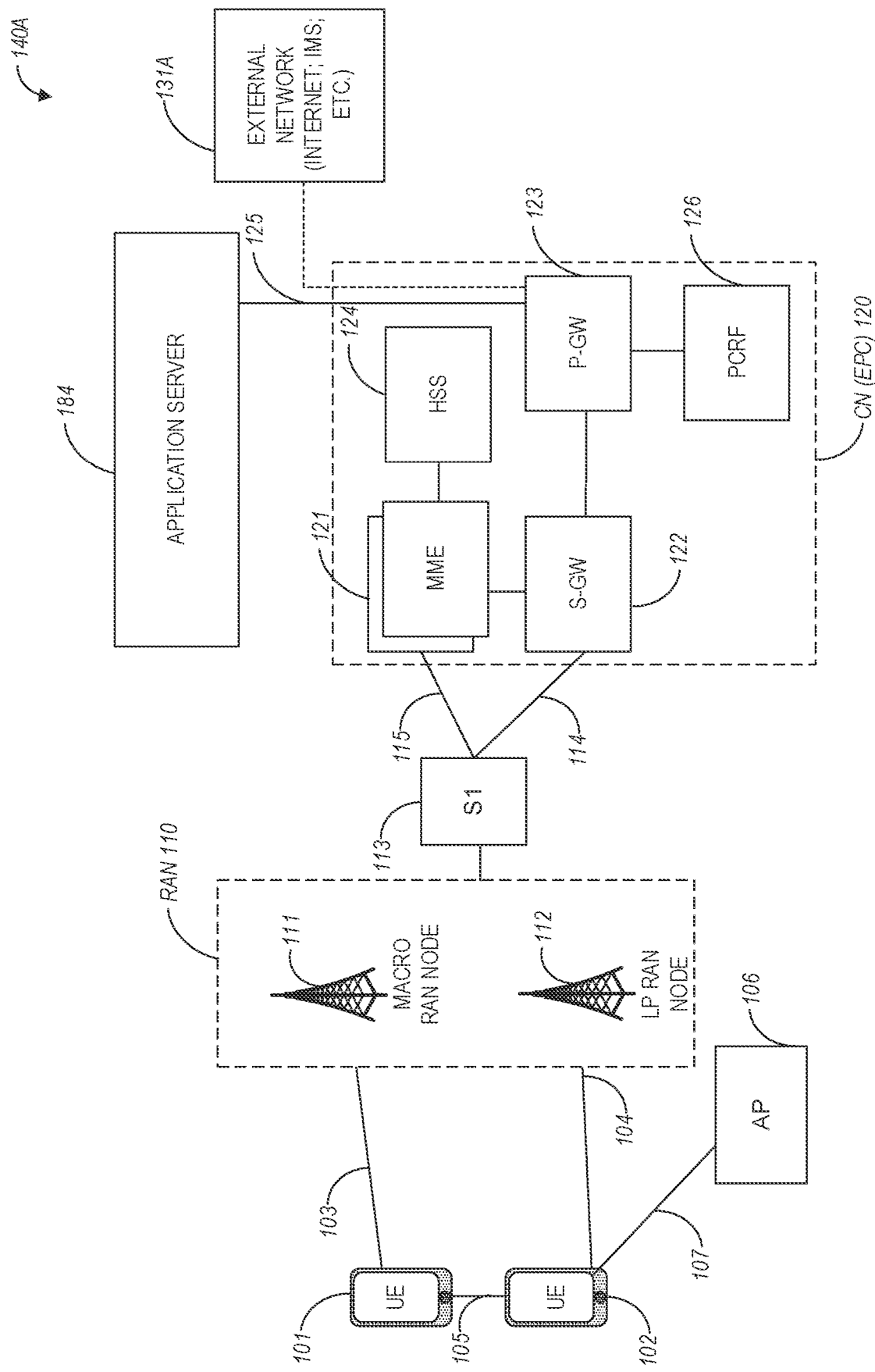
FIG. 1A illustrates an architecture of a network, in accordance with some aspects.

FIG. 1A illustrates an architecture of a network in accordance with some aspects. The network 140A is shown to include user equipment (UE) 101 and UE 102. The UEs 101 and 102 are illustrated as smartphones (e.g., handheld touchscreen mobile computing devices connectable to one or more cellular networks) but may also include any mobile or non-mobile computing device, such as Personal Data Assistants (PDAs), pagers, laptop computers, desktop computers, wireless handsets, drones, or any other computing device including a wired and/or wireless communications interface. The UEs 101 and 102 can be collectively referred to herein as UE 101, and UE 101 can be used to perform one or more of the techniques disclosed herein.

Any of the radio links described herein (e.g., as used in the network 140A or any other illustrated network) may operate according to any exemplary radio communication technology and/or standard.

LTE and LTE-Advanced are standards for wireless communications of high-speed data for UE such as mobile telephones. In LTE-Advanced and various wireless systems, carrier aggregation is a technology according to which multiple carrier signals operating on different frequencies may be used to carry communications for a single UE, thus increasing the bandwidth available to a single device. In some aspects, carrier aggregation may be used where one or more component carriers operate on unlicensed frequencies.

Aspects described herein can be used in the context of any spectrum management scheme including, for example, dedicated licensed spectrum, unlicensed spectrum, (licensed) shared spectrum (such as Licensed Shared Access (LSA) in 2.3-2.4 GHz, 3.4-3.6 GHz, 3.6-3.8 GHz, and further frequencies and Spectrum Access System (SAS) in 3.55-3.7 GHz and further frequencies).

Aspects described herein can also be applied to different Single Carrier or OFDM flavors (CP-OFDM, SC-FDMA, SC-OFDM, filter bank-based multicarrier (FBMC), OFDMA, etc.) and in particular 3GPP NR (New Radio) by allocating the OFDM carrier data bit vectors to the corresponding symbol resources.

In some aspects, any of the UEs 101 and 102 can comprise an Internet-of-Things (IoT) UE or a Cellular IoT (CIoT) UE, which can comprise a network access layer designed for low-power IoT applications utilizing short-lived UE connections. In some aspects, any of the UEs 101 and 102 can include a narrowband (NB) IoT UE (e.g., such as an enhanced NB-IoT (eNB-IoT) UE and Further Enhanced (FeNB-IoT) UE). An IoT UE can utilize technologies such as machine-to-machine (M2M) or machine-type communications (MTC) for exchanging data with an MTC server or device via a public land mobile network (PLMN), Proximity-Based Service (ProSe), air device-to-device (D2D) communication, sensor networks, or IoT networks. The M2M or MTC exchange of data may be a machine-initiated exchange of data. An IoT network includes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

In some aspects, any of the UEs 101 and 102 can include enhanced MTC (eMTC) UEs or further enhanced MTC (FeMTC) UEs.

The UEs 101 and 102 may be configured to connect, e.g., communicatively couple, with a radio access network (RAN) 110. The RAN 110 may be, for example, an Evolved Universal Mobile Telecommunications System (UMTS) Terrestrial Radio Access Network (E-UTRAN), a NextGen RAN (NG RAN), or some other type of RAN. The UEs 101 and 102 utilize connections 103 and 104, respectively, each of which comprises a physical communications interface or layer (discussed in further detail below); in this example, the connections 103 and 104 are illustrated as an air interface to enable communicative coupling and can be consistent with cellular communications protocols, such as a Global System for Mobile Communications (GSM) protocol, a code-division multiple access (CDMA) network protocol, a Push-to-Talk (PIT) protocol, a PIT over Cellular (POC) protocol, a Universal Mobile Telecommunications System (UNITS) protocol, a 3GPP Long Term Evolution (LTE) protocol, a fifth-generation (5G) protocol, a New Radio (NR) protocol, and the like.

In an aspect, the UEs 101 and 102 may further directly exchange communication data via, a ProSe interface 105. The ProSe interface 105 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 102 is shown to be configured to access an access point (AP) 106 via connection 107. The connection 107 can comprise a local wireless connection, such as, for example, a connection consistent with any IEEE 802.11 protocol, according to which the AP 106 can comprise a wireless fidelity (WiFi®) router. In this example, the AP 106 is shown to be connected to the Internet without connecting to the core network of the wireless system (described in further detail below).

The RAN 110 can include one or more access nodes that enable connections 103 and 104. These access nodes (ANs) can be referred to as base stations (BSs). NodeBs, evolved NodeBs (eNBs), Next Generation NodeBs (gNBs), RAN network nodes, and the like, and can comprise ground stations (e.g., terrestrial access points) or satellite stations providing coverage within a geographic area (e.g., a cell). In some aspects, the communication nodes 111 and 112 can be transmission/reception points (TRPs). In instances when the communication nodes 111 and 112 are NodeBs (e.g., eNBs or gNBs), one or more TRPs can function within the communication cell of the NodeBs. The RAN 110 may include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some aspects, any of the RAN nodes 111 and 112 can fulfill various logical functions for the RAN 110 including, but not limited to, radio network controller (RNC) functions such as radio bearer management, uplink and downlink dynamic radio resource management, and data packet scheduling, and mobility management. In an example, any of the nodes 111 and/or 112 can be a new generation Node-B (gNB), an evolved node-B (eNB), or another type of RAN node.

The RAN 110 is shown to be communicatively coupled to a core network (CN) 120 via an S1 interface 113. In aspects, the CN 120 may be an evolved packet core (EPC) network, a NextGen Packet Core (NPC) network, or some other type of CN (e.g., as illustrated in reference to FIGS. 1B-1C). In this aspect, the S1 interface 113 is split into two parts: the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMES 121.

In this aspect, the CN 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (CPRS) Support Nodes (SGSN). The MMEs 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities of the S-GW 122 may include a lawful intercept, charging, and some policy enforcement.

The P-GW 123 may terminate an SGi interface toward a PDN. The P-GW 123 may route data packets between the EPC network 120 and external networks such as a network including the application server 184 (alternatively referred to as application function (AF)) via an Internet Protocol (IP) interface 125. The P-GW 123 can also communicate data to other external networks 131A, which can include the Internet, IP multimedia subsystem (IPS) network, and other networks. Generally, the application server 184 may be an element offering applications that use IP bearer resources with the core network (e.g., UMTS Packet Services (PS) domain, LTE PS data services, etc.). In this aspect, the P-GW 123 is shown to be communicatively coupled to an application server 184 via an IP interface 125. The application server 184 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 may further be a node for policy enforcement and charging data collection. Policy and Charging Rules Function (PCRF) 126 is the policy and charging control element of the CN 120. In a non-roaming scenario, in some aspects, there may be a single PCRF in the Home Public Land Mobile Network (HPLMN) associated with a UE's Internet Protocol Connectivity Access Network (IP-CAN) session. In a roaming scenario with a local breakout of traffic, there may be two PCRFs associated with a UE's IP-CAN session: a Home PCRF (H-PCRF) within an HPLMN and a Visited PCRF (V-PCRF) within a Visited Public Land Mobile Network (VPLMN). The PCRF 126 may be communicatively coupled to the application server 184 via the P-GW 123.

In some aspects, the communication network 140A can be an IoT network or a 5G network, including a 5G new radio network using communications in the licensed (5G NR) and the unlicensed (5G NR-U) spectrum. One of the current enablers of IoT is the narrowband-IoT (NB-IoT).

An NG system architecture can include the RAN 110 and a 5G network core (5G C) 120. The NG-RAN 110 can include a plurality of nodes, such as gNBs and NG-eNBs. The core network 120 (e.g., a 5G core network or 5GC) can include an access and mobility function (AMF) and/or a user plane function (UPF). The AMF and the UPF can be communicatively coupled to the gNBs and the NG-eNBs via NG interfaces. More specifically, in some aspects, the gNBs and the NG-eNBs can be connected to the AMF by NG-C interfaces, and to the UPF by NG-U interfaces. The gNBs and the NG-eNBs can be coupled to each other via Xn interfaces.

In some aspects, the NG system architecture can use reference points between various nodes as provided by 3GPP Technical Specification (TS) 23.501 (e.g., V15.4.0, 2018-12). In some aspects, each of the gNBs and the NG-eNBs can be implemented as a base station, a mobile edge server, a small cell, a home eNB, and so forth. In some aspects, a gNB can be a master node (MN) and NG-eNB can be a secondary node (SN) in a 5G architecture.

Figure 1B:
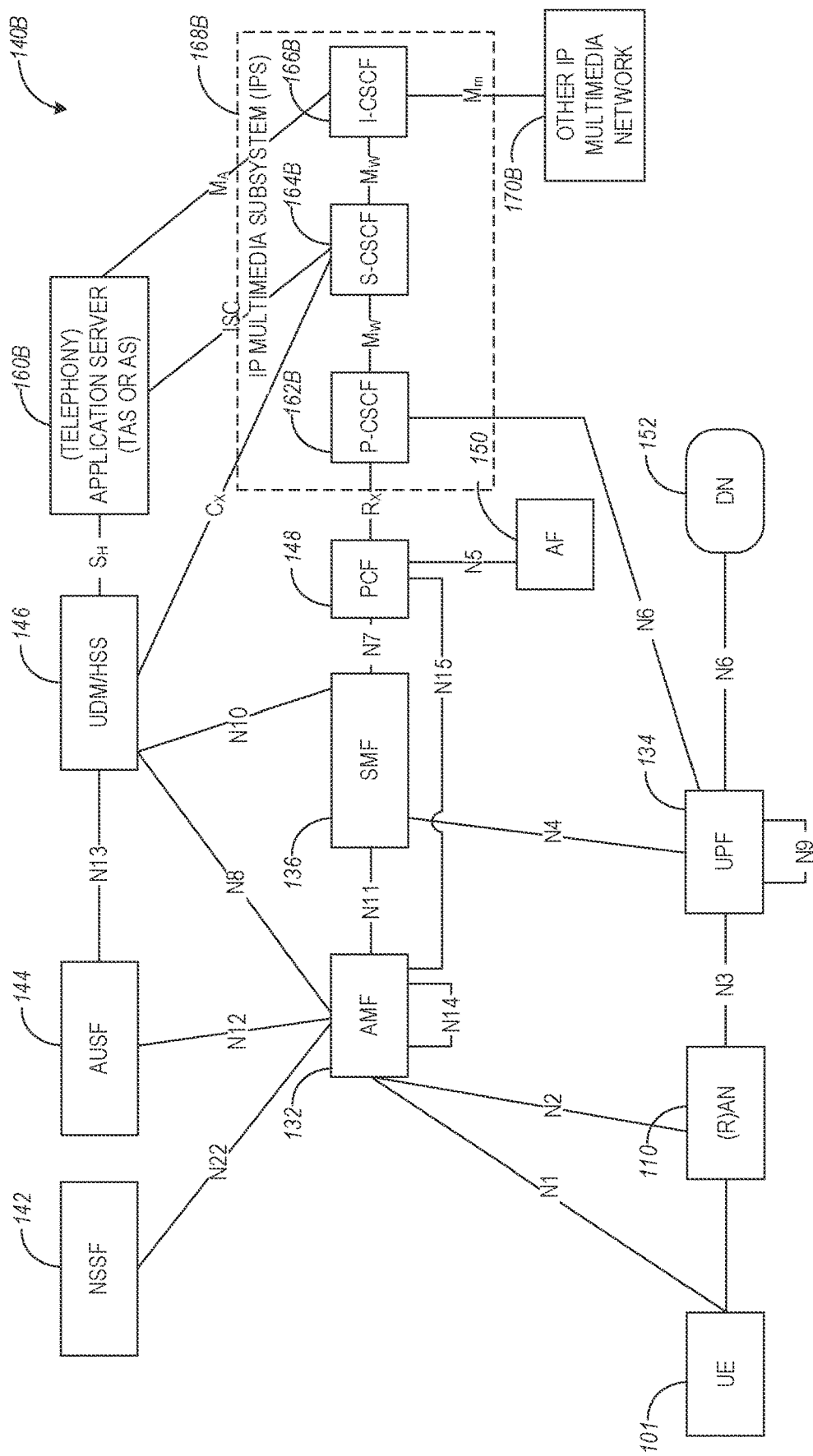
FIG. 1B and FIG. 1C illustrate a non-roaming 5G system architecture in accordance with some aspects.

FIG. 1B illustrates a non-roaming 5G system architecture in accordance with some aspects. Referring to FIG. 1B, there is illustrated a 5G system architecture 140B in a reference point representation. More specifically, UE 102 can be in communication with RAN 110 as well as one or more other 5G core (5GC) network entities. The 5G system architecture 140B includes a plurality of network functions (NFs), such as access and mobility management function (AMF) 132, session management function (SMF) 136, policy control function (PCF) 148, application function (AF) 150, user plane function (UPF) 134, network slice selection function (NSSF) 142, authentication server function (AUSF) 144, and unified data management (UDM)/hone subscriber server (HSS) 146. The UPF 134 can provide a connection to a data network (DN) 152, which can include, for example, operator services, Internet access, or third-party services. The AMF 132 can be used to manage access control and mobility and can also include network slice selection functionality. The SMF 136 can be configured to set up and manage various sessions according to network policy. The UPF 134 can be deployed in one or more configurations according to the desired service type. The PCF 148 can be configured to provide a policy framework using network slicing, mobility management, and roaming (similar to PCRF in a 4G communication system). The UDM can be configured to store subscriber profiles and data (similar to an HSS in a 4G communication system).

In some aspects, the 5G system architecture 140B includes an IP multimedia subsystem (IMS) 168B as well as a plurality of IP multimedia core network subsystem entities, such as call session control functions (CSCFs). More specifically, the IMS 168B includes a CSCF, which can act as a proxy CSCF (P-CSCF) 162BE, a serving CSCF (S-CSCF) 164B, an emergency CSCF (E-CSCF) (not illustrated in FIG. 1B), or interrogating CSCF (I-CSCE) 166B. The P-CSCF 162B can be configured to be the first contact point for the UE 102 within the IM subsystem (IMS) 168B. The S-CSCF 164B can be configured to handle the session states in the network, and the E-CSCF can be configured to handle certain aspects of emergency sessions such as routing an emergency request to the correct emergency center or PSAP. The I-CSCF 166B can be configured to function as the contact point within an operator's network for all IMS connections destined to a subscriber of that network operator, or a roaming subscriber currently located within that network operator's service area. In some aspects, the I-CSCF 166B can be connected to another IP multimedia network 170E, e.g. an IMS operated by a different network operator.

In some aspects, the UDM/HSS 146 can be coupled to an application server 160E, which can include a telephony application server (TAS) or another application server (AS). The AS 160B can be coupled to the IMS 168B via the S-CSCF 164B or the I-CSCF 166B.

A reference point representation shows that interaction can exist between corresponding NF services. For example, FIG. 1B illustrates the following reference points: N1 (between the UE 102 and the AMF 132), N2 (between the RAN 110 and the NNW 132). N3 (between the RAN 110 and the UPF 134), N4 (between the SMF 136 and the UPF 134), N5 (between the PCF 148 and the AF 150, not shown), N6 (between the UPF 134 and the DN 152), N7 (between the SMF 136 and the PCF 148, not shown), N8 (between the UDM 146 and the AMF 132, not shown), N9 (between two UPFs 134, not shown), N10 (between the UDM 146 and the SMF 136, not shown), N11 (between the AMF 132 and the SMF 136, not shown), N12 (between the AUSF 144 and the AMF 132, not shown), N13 (between the AUSF 144 and the UDM 146, not shown), N14 (between two AMFs 132, not shown), N15 (between the PCF 148 and the AMF 132 in case of a non-roaming scenario, or between the PCF 148 and a visited network and AMF 132 in case of a roaming scenario, not shown), N16 (between two SMFs, not shown), and N22 (between AMF 132 and NSSF 142, not shown). Other reference point representations not shown in FIG. 1B can also be used.

Figure 1C:
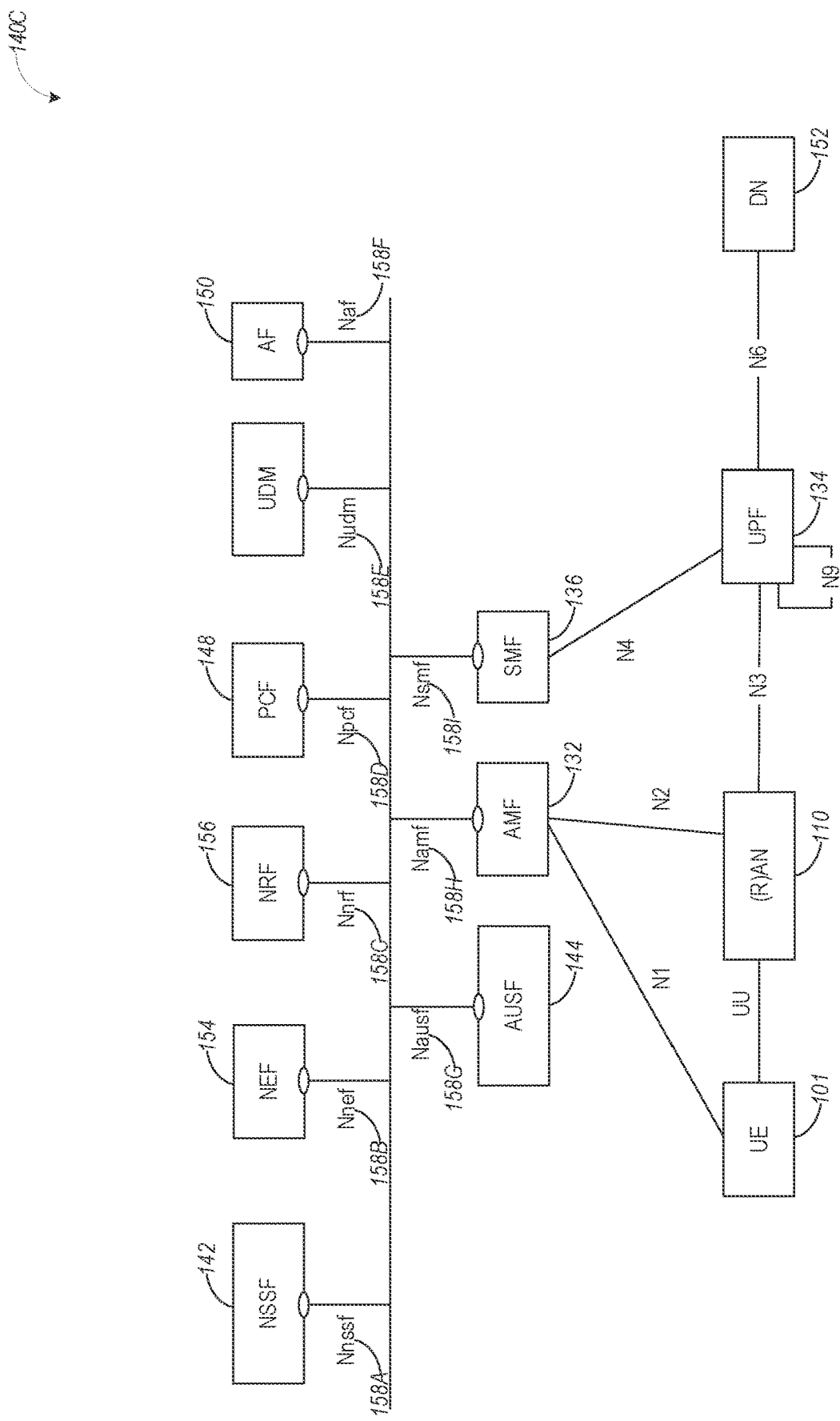

FIG. 1C illustrates a 5G system architecture 140C and a service-based representation. In addition to the network entities illustrated in FIG. 1B, system architecture 140C can also include a network exposure function (NEF) 154 and a network repository function (NRF) 156. In some aspects, 5G system architectures can be service-based and interaction between network functions can be represented by corresponding point-to-point reference points Ni or as service-based interfaces.

In some aspects, as illustrated in FIG. 1C, service-based representations can be used to represent network functions within the control plane that enable other authorized network functions to access their services. In this regard, 5G system architecture 1400 can include the following service-based interfaces: Namf 158H (a service-based interface exhibited by the AMF 132), Nsmf 158I (a service-based interface exhibited by the SMF 136), Nnef 158B (a service-based interface exhibited by the NEF 154), Npcf 158D (a service-based interface exhibited by the PCF 148), a Nudm 158E (a service-based interface exhibited by the UDM 146), Naf 158E (a service-based interface exhibited by the AF 150), Nnrf 158C (a service-based interface exhibited by the NRF 156), Nnssf 158A (a service-based interface exhibited by the NSSF 142), Nausf 158G (a service-based interface exhibited by the AUSF 144). Other service-based interfaces (e.g., Nudr, N5g-eir, and Nudsf) not shown in FIG. 1C can also be used.

In example embodiments, any of the UEs or base stations discussed in connection with FIG. 1A-FIG. 1C can be configured to operate using the techniques discussed herein associated with positioning measurements such as positioning measurements in NRPPa. The term "base station" is interchangeable with the term "RAN network node."

In some aspects, new positioning methods can be used in connection with NRPPa, including NR enhanced cell ID methods, multi-round trip time (RTT) positioning, downlink (DL) angle of departure (AoD) positioning, DL time difference of arrival (TDOA) positioning, uplink (UL) TDOA positioning, and UL angle of arrival (AoA).

The present disclosure includes techniques for triggering measurements (from a location management function (LMF) node to gNB) and to report positioning measurement results (from gNB to the LMF node).

In some aspects, positioning measurement messages and information elements are defined to support triggering of all positioning methods being defined in Release-16, along with messages and IEs for measurement results reporting.

The positioning methods mentioned above rely on the following measurements which can be requested by the LMF from a gNB: synchronization signal reference signal received power (SS-RSRP); synchronization signal reference signal received quality (SS-RSRQ); channel state information reference signal received power (CSI-RSRP); channel state information reference signal received quality (CSI-RSRQ); gNB receive (Rx)-transmit (Tx) time difference; uplink (UL) sounding reference signal (SRS) reference signal received power (UL SRS-RSRP); UL angle of arrival information; UL relative time of arrival (UL RTOA); and UL-SRS-RSRP.

In some aspects, a common messaging framework allowing LMF to request and gNB to report all relevant measurements and combinations thereof may be used.

In some embodiments, when reporting measurement results to LMF, the base station (e.g., gNB) may also provide the following information: cell portion ID, NR Cell Global Identifier, Physical Cell ID, a time stamp of the measurement.

In some aspects, LMF/gNB interactions in a positioning procedure may include the following communications:
(a) LMF sends a MEASUREMENT REQUEST message, indicating which measurements gNB shall perform; and
(b) gNB either replies with a MEASUREMENT RESPONSE (one-shot message), if the LMF requested on-demand measurements or with a MEASUREMENT REPORT, if the LMF requested periodic measurements. Both messages can carry the list of measurement results.

In some aspects, since both the MEASUREMENT RESPONSE and the MEASUREMENT REPORT messages may carry the same information, they use the same measurement result IE list (defined below). That IE can also be re-used in other interfaces, e.g. F1 (since in the split gNB architecture gNB-CU relays the positioning measurement received from the LMF to the gNB-DU and, in the opposite direction, replays the measurement results received from gNB-DU(s) to LMF).

In some embodiments, the message formats may be defined as provided hereinbelow.

Measurement Request

This message (which is detailed at TABLES 1-3 below) is sent by the LMF to request the NG-RAN node to configure a positioning measurement. Direction: LMF to NG-RAN node.

TABLE 1

| IE/Group Name | Presence | Range | IE type and reference | Semantics description | Criticality | Assigned Criticality |
|---|---|---|---|---|---|---|
| Message Type | M | | 9.2.3 | | YES | reject |
| NRPPa Transaction ID | M | | 9.2.4 | | — | |
| LMF UE Measurement ID | M | | INTEGER (1 . . . 15, . . . ) | | YES | reject |
| Report Characteristics | M | | ENUMERATED (OnDemand, Periodic, . . . ) | | YES | reject |
| Measurement Periodicity | C-ifReport Characteristics Periodic | | ENUMERATED (120 ms, 240 ms, 480 ms, 640 ms, 1024 ms, 2048 ms, 5120 ms, 10240 ms, 1 min, 6 min, 12 min, 30 min, 60 min, . . . ) | | YES | reject |
| Measurement Type | | 1 . . . <max no Measurement types> | | | | |

TABLE 1-continued

| IE/Group Name | Presence | Range | IE type and reference | Semantics description | Criticality | Assigned Criticality |
|---|---|---|---|---|---|---|
| >Measurement Item | M | | ENUMERATED (SS-RSRP, SS-RSRQ, CSI-RSRP, CSI-RSRQ, gNBRxTxTimeDiff, ULSRS-RSRP, ULAoA, UL-RTOA, . . . ) | | YES | reject |
| Measurement Configuration TYPe | | 1 . . . <max no Measurement Configuration types> | | | | |
| >Measurement Configuration Item | M | | 9.2.z10 | | YES | ignore |

TABLE 2

| Condition | Explanation |
|---|---|
| ifReportCharacteristicsPeriodic | This IE shall be present if the Report Characteristics IE is set to the value "Periodic". |

TABLE 3

| Range bound | Explanation |
|---|---|
| maxnoMeasurementtypes | Maximum no. of configured measurements. Value is FFS. |
| maxnoMeasurement Configurationtypes | Maximum no. of configured measurements. Value is FFS. |

Measurement Response

This message (detailed at TABLES 4-5) is sent by the NG-RAN node to report positioning measurements for the target UE. Direction: NG-RAN node to the LMF node.

TABLE 4

| IE/Group Name | Presence | Range | IE type and reference | Semantics description | Criticality | Assigned Criticality |
|---|---|---|---|---|---|---|
| Message Type | M | | 9.2.3 | | YES | reject |
| NRPPa Transaction ID | M | | 9.2.4 | | — | |
| LMF UE Measurement ID | M | | INTEGER (1 . . . 15, . . . ) | | YES | reject |
| RAN UE Measurement ID | M | | INTEGER (1 . . . 15, . . . ) | | YES | reject |
| Measurement Result | | 1 . . . <max no Measurement types> | | | | |
| >Measurement Result Item | M | | 9.2.z8 | | | |
| Criticality Diagnostics | O | | 9.2.11 | | YES | ignore |

TABLE 5

| Range bound | Explanation | |
|---|---|---|
| maxnoMeasurementresulttypes | Maximum no. of configured measurements. Value is FFS. | 5 |

Measurement Report

This message (detailed at TABLE 6 below) is sent by the NG-RAN node to report positioning measurements for the target UE. Direction: NG-RAN node to the LMF node.

TABLE 6

| IE/Group Name | Presence | Range | IE type and reference | Semantics description | Criticality | Assigned Criticality |
|---|---|---|---|---|---|---|
| Message Type | M | | 9.2.3 | | YES | reject |
| NRPPa Transaction ID | M | | 9.2.4 | | — | |
| LMF UE Measurement ID | M | | INTEGER (1 ... 15, ... ) | | YES | reject |
| RAN UE Measurement ID | M | | INTEGER (1 ... 15, ... ) | | YES | reject |
| Measurement Result | | 1 ... <max no Measurement types> | | | | |
| >Measurement Result Item | M | | 9.2.z8 | | | |

The following are example Measurement Result items.

UL RTOA Measurement

This information element (provided in TABLE 7 below) contains the uplink RTOA measurement.

TABLE 7

| IE/Group Name | Presence | Range | IE Type and Reference | Semantics Description |
|---|---|---|---|---|
| NR ARFCN | M | | INTEGER (0 ... 3279165) | |
| Value UL RTOA | M | | INTEGER (0 ... FFS) | |

RSRP Measurement

This information element (provided in TABLE 8 below) contains the SS-RSRP measurement.

TABLE 8

| IE/Group Name | Presence | Range | IE Type and Reference | Semantics Description |
|---|---|---|---|---|
| NR PCI | M | | INTEGER (0 ... 1007) | Physical Cell Identifier of the reported cell |
| NR ARFCN | M | | INTEGER (0 ... 3279165) | |
| CGI NR | O | | CGI NR 9.2.z7 | NR Cell Global Identifier of the reported cell |
| Value RSRP | M | | INTEGER (0 ... 127) | |

RSRQ Measurement

This information element (provided in TABLE 9 below) contains the SS-RSRQ measurement.

TABLE 9

| IE/Group Name | Presence | Range | IE Type and Reference | Semantics Description |
|---|---|---|---|---|
| NR PCI | M | | INTEGER (0 ... 127) | Physical Cell Identifier of the reported cell |
| NR ARFCN | M | | INTEGER (0 ... 3279165) | |
| CGI NR | O | | CGI NR 9.2.z7 | NR Cell Global Identifier of the reported cell |
| Value RSRQ | M | | INTEGER (0 ... 127) | | gNB RxTx Time Difference Measurement

This information element (provided in TABLE 10 below) contains the gNB RxTx Time Difference measurement.

TABLE 10

| IE/Group Name | Presence | Range | IE Type and Reference | Semantics Description |
|---|---|---|---|---|
| gNB Rx-Tx Time Difference | | | INTEGER (0 ... FFS) | |

UL AoA Measurement

This information element (provided in TABLE 11) contains the uplink angle of arrival measurement.

TABLE 11

| IE/Group Name | Presence | Range | IE Type and Reference | Semantics Description |
|---|---|---|---|---|
| Angle of Arrival | | | INTEGER (0 ... FFS) | |

The Cell Global Identifier EUTRA (provided in TABLE 12) is used to globally identify an E-UTRA cell.

TABLE 12

| IE/Group Name | Presence | Range | IE Type Reference | Semantics Description |
|---|---|---|---|---|
| PLMN identity | M | | 9.2.8 | |
| NR Cell Identifier | M | | BIT STRING (36) | |

Measurement Result Item

This information element (provided in TABLE 13 below) contains the measurement result.

TABLE 13

| IE/Group Name | Presence | Range | IE Type and Reference | Semantics Description |
|---|---|---|---|---|
| Timestatnp | O | | 9.7.z9 | |
| >CHOICE Measured Result | M | | | |
| >>SS RSRP Measurement | O | | 9.2.z1 | |
| >>SS RSRQ Measurement | O | | 9.2.z2 | |
| >>CSI RSRP Measurement | O | | 9.2.z3 | |
| >>CSI RSRQ Measurement | O | | 9.2.z4 | |
| >>gNB RxTx Time Difference Measurement | O | | 9.2.z5 | |
| >>UL SRS RSRP Measurement | O | | 9.2.z1 | |
| >>UL AoA Measurement | O | | 9.2.z6 | |
| >>UL RTOA Measurement | O | | 9.2.z | |

Timestamp

This information element (provided in TABLE 14 below) contains the timestamp of the measurement result.

TABLE 14

| IE/Group Name | Presence | Range | IE Type and Reference | Semantics Description |
|---|---|---|---|---|
| SFN | | | INTEGER (0 . . . 1023) | |

Measurement Configuration Item

This information element (provided in TABLE 15 below) contains the measurement result.

TABLE 15

| IE/Group Name | Presence | Range | IE Type and Reference | Semantics Description |
|---|---|---|---|---|
| >CHOICE Measurement Configuration | M | | | |
| >>SRS Configuration | O | | 9.2.z | |

In some aspects, a gNB is connected to an LMF and supports the following positioning methods: NR Enhanced Cell ID methods, Multi-RTT positioning, DL AoD positioning, DL TDOA positioning, UL TDOA positioning, and UL AoA. In some embodiments, the gNB is further configured to receive the MEASUREMENT REQUEST message from the LMF, carrying the list of measurements the gNB is requested to perform. In some aspects, the gNB is further configured to provide in MEASUREMENT RESPONSE and MEASUREMENT REPORT messages the list of positioning measurement results, specifically: SS Reference signal received power (SS-RSRP), SS Reference Signal Received Quality (SS-RSRQ), CSI Reference signal received power (CSI-RSRP), CSI Reference Signal Received. Quality (CSI-RSRQ), gNB Rx–Tx time difference measurement, UL SRS-RSRP, UL Angle of Arrival (azimuth and elevation), UL RTOA, and UL SRS-RSRP.

In some embodiments, the measurements are performed by the base station. In other cases, the base station, after receiving the measurement request from the LMF, would further request the UE to perform the measurements (which, for example, would be the case for CSI-RSRP 2.7 measurement).

Figure 2:
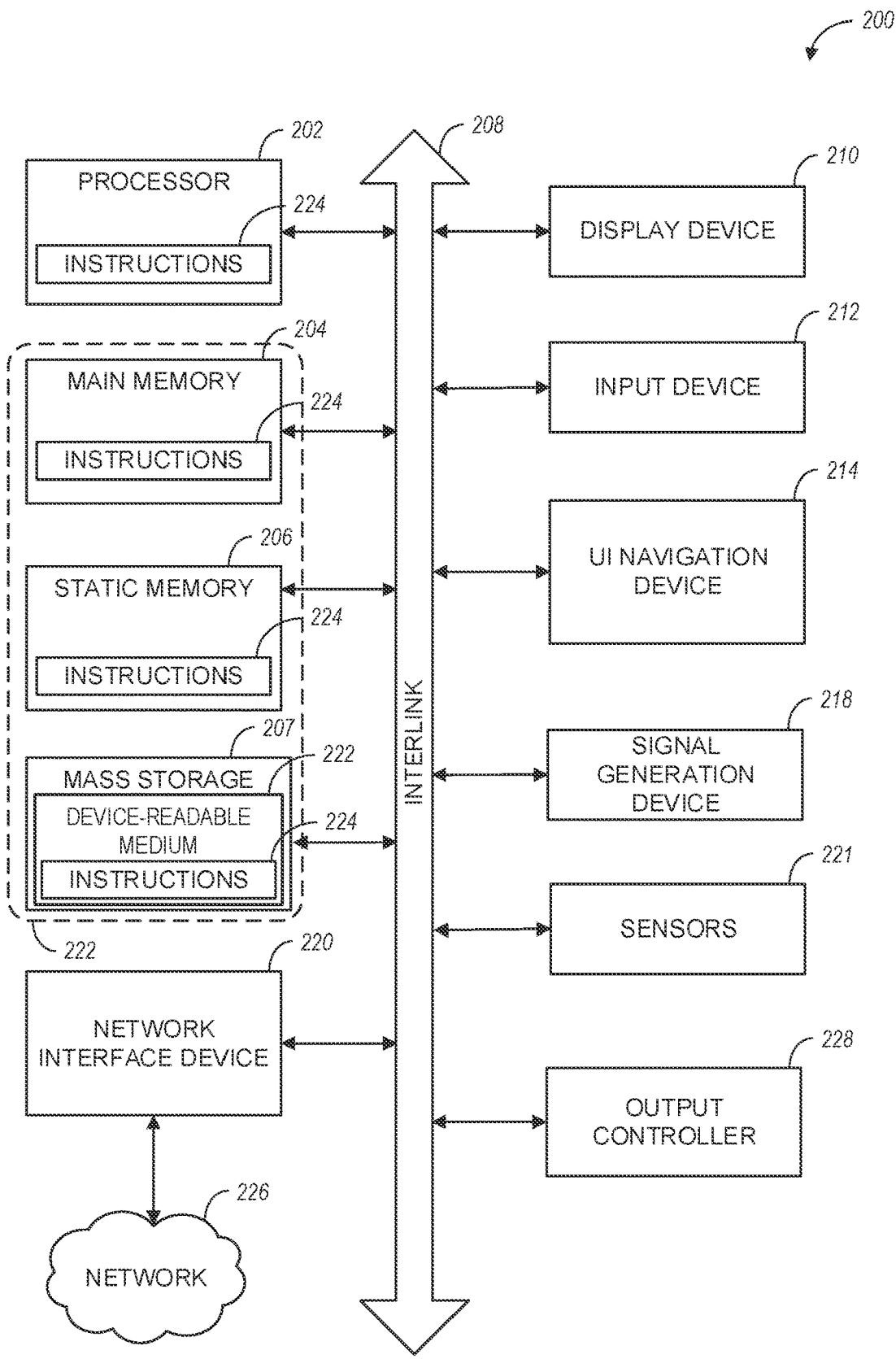
FIG. 2 illustrates a block diagram of a communication device such as an evolved Node-B (eNB), a new generation Node-B (gNB), an access point (AP), a wireless station (STA), a mobile station (MS), or a user equipment (LTE), in accordance with some aspects.

FIG. 2 illustrates a block diagram of a communication device such as an evolved Node-B (eNB), a next generation Node-B (gNB), an access point (AP), a wireless station (STA), a mobile station (MS), or a user equipment (UE), in accordance with some aspects and to perform one or more of the techniques disclosed herein. In alternative aspects, the communication device 200 may operate as a standalone device or may be connected (e.g., networked) to other communication devices.

Circuitry (e.g., processing circuitry) is a collection of circuits implemented in tangible entities of the device 200 that include hardware (e.g., simple circuits, gates, logic, etc.). Circuitry membership may be flexible over time. Circuitries include members that may, alone or in combination, perform specified operations when operating. In an example, the hardware of the circuitry may be immutably designed to carry out a specific operation (e.g., hardwired). In an example, the hardware of the circuitry may include variably connected physical components (e.g., execution units, transistors, simple circuits, etc.) including a machine-readable medium physically modified (e.g., magnetically, electrically, moveable placement of invariant massed particles, etc.) to encode instructions of the specific operation.

In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine-readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the device 200 follow.

In some aspects, the device 200 may operate as a standalone device or may be connected (e.g., networked) to other devices. In a networked deployment, the communication device 200 may operate in the capacity of a server communication device, a client communication device, or both in server-client network environments. In an example, the communication device 200 may act as a peer communication device in a peer-to-peer (P2P) (or other distributed)

network environment. The communication device 200 may be a UE, eNB, PC, a tablet PC, an STB, a PDA, a mobile telephone, a smartphone, a web appliance, a network router, switch or bridge, or any communication device capable of executing instructions (sequential or otherwise) that specify actions to be taken by that communication device. Further, while only a single communication device is illustrated, the term "communication device" shall also be taken to include any collection of communication devices that individually or jointly execute a set (or multiple sets) of instructions to perform any one or more of the methodologies discussed herein, such as cloud computing, software as a service (SaaS), and other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client, or server computer system) or one or more hardware processors may be configured by firmware or software (e.g., instructions, an application portion, or an application) as a module that operates to perform specified operations. In an example, the software may reside on a communication device-readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using the software, the general-purpose hardware processor may be configured as respective different modules at different times. The software may accordingly configure a hardware processor, for example, to constitute a particular module at one instance of time and to constitute a different module at a different instance of time.

The communication device (e.g., UE) 200 may include a hardware processor 202 (e.g., a central processing unit (CPU), a graphics processing unit (GPU), a hardware processor core, or any combination thereof), a main memory 204, a static memory 206, and mass storage 207 (e.g., hard drive, tape drive, flash storage, or other block or storage devices), some or all of which may communicate with each other via an interlink (e.g., bus) 208.

The communication device 200 may further include a display device 210, an alphanumeric input device 212 (e.g., a keyboard), and a user interface (UI) navigation device 214 (e.g., a mouse). In an example, the display device 210, input device 212, and UI navigation device 214 may be a touchscreen display. The communication device 200 may additionally include a signal generation device 218 (e.g., a speaker), a network interface device 220, and one or more sensors 221, such as a global positioning system (GPS) sensor, compass, accelerometer, or another sensor. The communication device 200 may include an output controller 228, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 207 may include a communication device-readable medium 222, on which is stored one or more sets of data structures or instructions 224 (e.g., software) embodying or utilized by any one or more of the techniques or functions described herein. In some aspects, registers of the processor 202, the main memory 204, the static memory 206, and/or the mass storage 207 may be, or include (completely or at least partially), the device-readable medium 222, on which is stored the one or more sets of data structures or instructions 224, embodying or utilized by any one or more of the techniques or functions described herein. In an example, one or any combination of the hardware processor 202, the main memory 204, the static memory 206, or the mass storage 216 may constitute the device-readable medium 222.

As used herein, the term "device-readable medium" is interchangeable with "computer-readable medium" or "machine-readable medium". While the communication device-readable medium 222 is illustrated as a single medium, the term "communication device-readable medium" may include a single medium or multiple media (e.g., a centralized or distributed database, and/or associated caches and servers) configured to store the one or more instructions 224. The term "communication device-readable medium" is inclusive of the terms "machine-readable medium" or "computer-readable medium", and may include any medium that is capable of storing, encoding, or carrying instructions (e.g., instructions 224) for execution by the communication device 200 and that cause the communication device 200 to perform any one or more of the techniques of the present disclosure, or that is capable of storing, encoding or carrying data structures used by or associated with such instructions. Non-limiting communication device-readable medium examples may include solid-state memories and optical and magnetic media. Specific examples of communication device-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, communication device-readable media may include non-transitory communication device-readable media. In some examples, communication device-readable media may include communication device-readable media that is not a transitory propagating signal.

Instructions 224 may further be transmitted or received over a communications network 226 using a transmission medium via the network interface device 220 utilizing any one of a number of transfer protocols. In an example, the network interface device 220 may include one or more physical jacks (e.g., Ethernet, coaxial, or phone jacks) or one or more antennas to connect to the communications network 226. In an example, the network interface device 220 may include a plurality of antennas to wirelessly communicate using at least one of single-input-multiple-output (SIMO), MIMO, or multiple-input-single-output (MISO) techniques. In some examples, the network interface device 220 may wirelessly communicate using Multiple User MIMO techniques.

The term "transmission medium" shall be taken to include any intangible medium that is capable of storing, encoding, or carrying instructions for execution by the communication device 200, and includes digital or analog communications signals or another intangible medium to facilitate communication of such software. In this regard, a transmission medium in the context of this disclosure is a device-readable medium.

Although an aspect has been described with reference to specific exemplary aspects, it will be evident that various modifications and changes may be made to these aspects without departing from the broader scope of the present disclosure. Accordingly, the specification and drawings are to be regarded in an illustrative rather than a restrictive sense. This Detailed Description, therefore, is not to be taken in a limiting sense, and the scope of various aspects is defined only by the appended claims, along with the full range of equivalents to which such claims are entitled.

What is claimed is:

1. An apparatus to be used in a Next Generation Radio Access Network (NG-RAN) node including a plurality of Transmission-Reception Points (TRPs), the apparatus comprising:
  processing circuitry, wherein to configure the NG-RAN node for positioning measurement reporting by the plurality of TRPs using NR Positioning Protocol A (NRPPa), the processing circuitry is to:
    decode a measurement request from a location management function (LMF) node of the NG-RAN,
    the measurement request associated with a NRPPa measurement procedure and identifying TRP IDs of two or more TRPs of the plurality of TRPs in the NG-RAN node, and
    the measurement request including an information element (IE) type enumerating requested positioning measurements to be performed by the two or more TRPs for a target user equipment (UE), the requested positioning measurements performed at a periodicity specified by the measurement request; and
    encode a measurement response for transmission to the LMF node based on the measurement request, the measurement response including measurement results of the NRPPa measurement procedure obtained by a particular TRP of the two or more TRPs for the requested positioning measurements, the measurement results associated with a TRP ID of the particular TRP, and the measurement results obtained at the periodicity specified by the measurement request; and
  a memory coupled to the processing circuitry and configured to store the requested positioning measurements.

2. The apparatus of claim 1, wherein the measurement results of the NRPPa measurement procedure include an uplink (UL) angle of arrival measurement.

3. The apparatus of claim 2, wherein the measurement results of the NRPPa measurement procedure further include a gNB transmit-receive (Tx-Rx) time difference measurement.

4. The apparatus of claim 3, wherein the measurement results of the NRPPa measurement procedure further include a reference signal received power (RSRP) measurement.

5. The apparatus of claim 4, wherein the measurement results of the NRPPa measurement procedure further include an uplink (UL) relative time of arrival (RTOA) measurement.

6. The apparatus of claim 5, wherein the measurement results of the NRPPa measurement procedure further include timestamp information.

7. The apparatus of claim 1, wherein the measurement request associated with the NRPPa measurement procedure indicates a UE identifier of the target UE and a plurality of measurement items.

8. The apparatus of claim 7, wherein the plurality of measurement items include one or more of the following:
  synchronization signal reference signal received quality (SS-RSRQ); channel state information reference signal received power (CSI-RSRP);
  channel state information reference signal received quality (CSI-RSRQ);
  uplink (UL) sounding reference signal (SRS) reference signal received power (UL SRS-RSRP); and
  UL relative time of arrival (UL RTOA.

9. The apparatus of claim 8, wherein the processing circuitry is to:
  configure the measurement results of the NRPPa measurement procedure to include a result for each of the plurality of measurement items.

10. The apparatus of claim 1, further comprising transceiver circuitry coupled to the processing circuitry; and one or more antennas coupled to the transceiver circuitry.

11. A non-transitory computer-readable storage medium that stores instructions for execution by one or more processors of a location management function (LMF) node in a wireless network, the instructions to configure the LMF node for positioning measurement reporting using New Radio (NR) Positioning Protocol A (NRPPa), and to cause the LMF node to perform operations comprising:
  encoding a measurement request associated with a NRPPa measurement procedure for transmission to a Next Generation Radio Access Network (NG-RAN) node, the NG-RAN node including a plurality of Transmission-Reception Points (TRPs), the measurement request identifying TRP IDs of two or more TRPs of the plurality of TRPs in the NG-RAN node, and the measurement request including an information element (IE) type enumerating requested positioning measurements to be performed by the two or more TRPs for a target user equipment (UE), the requester measurements performed at a periodicity specified by the measurement request; and
  decoding a measurement response received from the NG-RAN node, the measurement response including measurement results of the NRPPa measurement procedure obtained by a particular TRP of the two or more TRPs for the requested positioning measurements, the measurement results associated with a TRP ID of the particular TRP, and the measurement results obtained at the periodicity specified by the measurement request.

12. The non-transitory computer-readable storage medium of claim 11, wherein the measurement results of the NRPPa measurement procedure include an uplink (UL) angle of arrival measurement.

13. The non-transitory computer-readable storage medium of claim 12, wherein the measurement results of the NRPPa measurement procedure further include a gNB transmit-receive (Tx-Rx) time difference measurement.

14. The non-transitory computer-readable storage medium of claim 13, wherein the measurement results of the NRPPa measurement procedure further include a reference signal received power (RSRP) measurement, an uplink (UL) relative time of arrival (RTOA) measurement, and timestamp information.

15. A non-transitory computer-readable storage medium that stores instructions for execution by one or more processors of a Next Generation Radio Access Network (NG- RAN) node including a plurality of Transmission-Reception Points (TRPs), the instructions to configure the NG-RAN node for positioning measurement reporting by the plurality of TRPs using NR Positioning Protocol A (NRPPa), and to cause the RAN network node to perform operations comprising:

decoding a measurement request associated with a NRPPa measurement procedure and from a location management function (LMF) node of the NG-RAN, the measurement request identifying TRP IDs of two or more TRPs of the plurality of TRPs in the NG-RAN node, and the measurement request including an information element (IE) type enumerating requested positioning measurements to be performed by the two or more TRPs for a target user equipment (UE), the requested positioning measurements performed at a periodicity specified by the measurement request; and encoding a measurement response for transmission to the LMF node based on the measurement request, the measurement response including measurement results of the NRPPa measurement procedure obtained by a particular TRP of the two or more TRPs for the requested positioning measurements, the measurement results associated with a TRP ID of the particular TRP, and the measurement results obtained at the periodicity specified by the measurement request.

16. The non-transitory computer-readable storage medium of claim 15, wherein the measurement results of the NRPPa measurement procedure include an uplink (UL) angle of arrival measurement.

17. The non-transitory computer-readable storage medium of claim 16, wherein the measurement results of the NRPPa measurement procedure further include a gNB transmit-receive (Tx-Rx) time difference measurement.

18. The non-transitory computer-readable storage medium of claim 17, wherein the measurement results of the NRPPa measurement procedure further include a reference signal received power (RSRP) measurement.

19. The non-transitory computer-readable storage medium of claim 18, wherein the measurement results of the NRPPa measurement procedure further include an uplink (UL) relative time of arrival (RTOA) measurement.

20. The non-transitory computer-readable storage medium of claim 19, wherein the measurement results of the NRPPa measurement procedure further include timestamp information.

\* \* \* \* \*